Oct. 29, 1974  A. FEDERICO  3,845,219
METHOD OF MAKING HIGH QUALITY FROZEN PIZZA CRUSTS
Filed Oct. 20, 1972
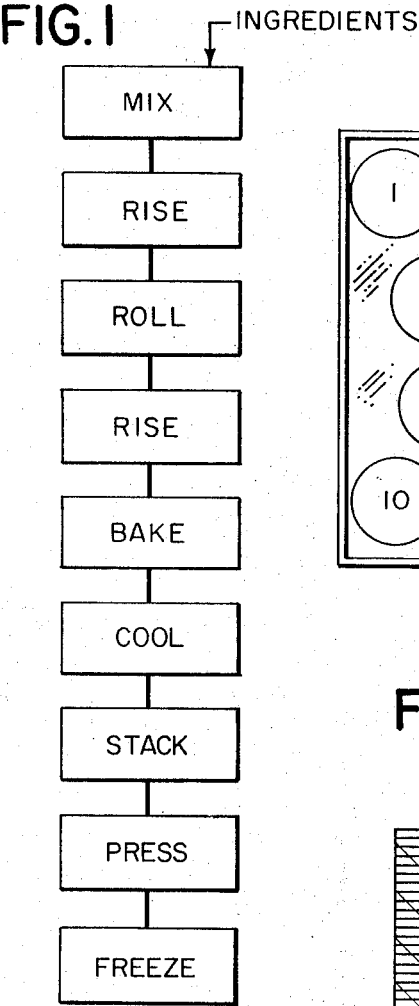
FIG. 1
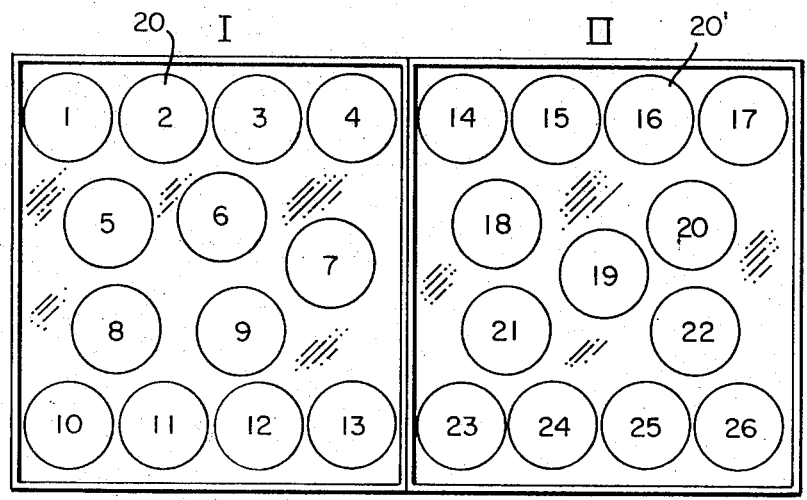
FIG. 2
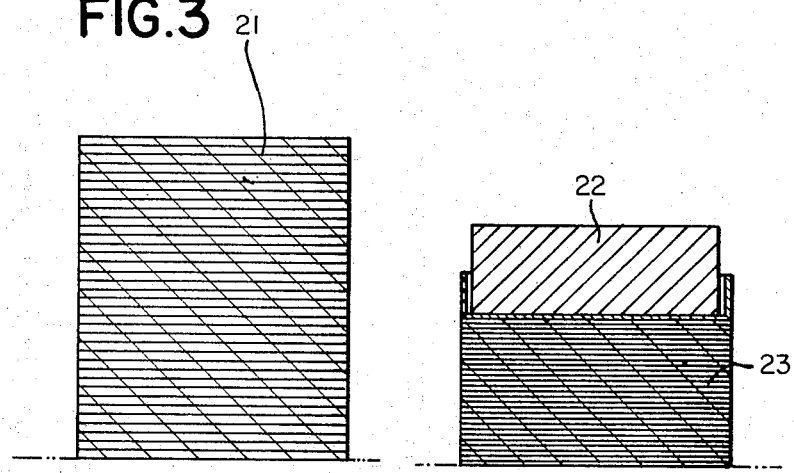
FIG. 3
FIG. 4
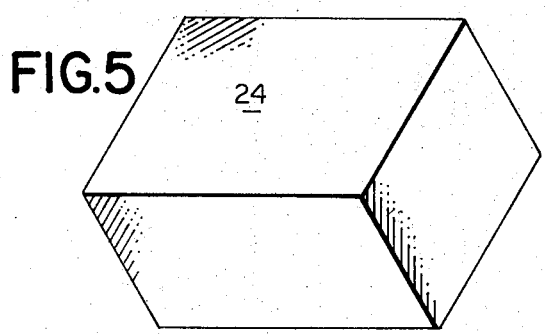
FIG. 5
INVENTOR.
ARTHUR FEDERICO
BY
Jackson, Jackson & Chovanes
ATTORNEYS.

United States Patent Office 3,845,219
Patented Oct. 29, 1974

---

3,845,219
METHOD OF MAKING HIGH QUALITY FROZEN PIZZA CRUSTS
Arthur Federico, 4 Explorer Road, Ocean Harbour, Brigantine, N.J. 08203
Continuation-in-part of abandoned application Ser. No. 97,652, Dec. 14, 1970. This application Oct. 20, 1972, Ser. No. 299,282
Int. Cl. A21d 8/00
U.S. Cl. 426—19                                    3 Claims

ABSTRACT OF THE DISCLOSURE

The present invention relates to a process of making pizza crusts of superior quality by mixing together the ingredients to make a dough, allowing the dough to rise for an elapsed time of 2½ hours to 3 hours at 50° F. or ½ hour at 80° F., rolling the dough into sheets, allowing the sheets to rise, baking the sheets of dough into crusts, cooling the crusts to approximately room temperature, stacking the crusts on top of one another face-to-face, packaging the crusts, compressing the stack of crusts to reduce the thickness to less than one-half, and then closing and sealing the package and freezing the crusts. The invention involves particularly using a composition of high gluten flour, yeast, vegetable shortening, whey, eggs and water.

In the preferred form the dough is subdivided into dome-shaped portions for individual pizza crusts and allowed to rise before rolling into sheets.

DISCLOSURE OF INVENTION

This application is a continuation-in-part of application Ser. No. 97,652, filed Dec. 14, 1970 for Pizza Crust and Method, now abandoned.

The present invention relates to a method of preparing pizza crusts of superior quality and keeping properties and which can be stored indefinitely as a frozen product and cooked and served as desired, without any preservative or chemical being added.

A purpose of the invention is to mix together the ingredients for pizza crusts, allow the dough to rise, roll the dough into sheets, place the sheets in pans suitably on baker's paper, allow the sheets to rise in the pans, bake the sheets of dough in the pans, remove the pizza crusts from the pans, cool the crusts to approximately room temperature, stack a multiplicity of crusts on top of one another individually face-to-face, package the crusts, press the crusts until the height is reduced to less than one-half, close and seal the packages, and freeze the crusts after packaging.

A further purpose is to mix together in a dough high gluten flour, yeast, sugar, salt, vegetable shortening whey, eggs and water in a process as just described.

Further purposes appear in the specification and in the claims.

In the drawings I have chosen to illustrate steps which are used in the processing according to the invention.

FIG. 1 is a flow sheet setting forth the steps of the process.

FIG. 2 shows in top plan view the dome-shaped portions of dough set in boxes to rise, conforming to batches Nos. 1 and 2.

FIG. 3 is a side elevation of a stack of pizza crusts before compressing.

FIG. 4 is a stack of pizza crusts after compressing, showing the compressive height.

FIG. 5 shows the ultimate package which is achieved by wrapping the compressed stack under compression.

In the prior art prepared pizzas, including frozen pizzas, have erred on the side of toughness and leatheriness in taste. Many of them also, even when prepared fresh, are not baked uniformly through, but have a very hard bottom crust and a soggy or partially cooked upper crust. This is especially true when they put sauce or other ingredients on before baking.

The present invention contemplates a method of making pizza crusts in which the crust is light, crisp and uniformly cooked all the way through and can be stored in frozen condition for long periods of time and then when served with sauce on the top, will retain its original quality and freshness.

The present invention contemplates a pizza crust which has excellent control of manufacture and is not subject to being excessively hard in any part or excessively soft in any part.

In the process of the invention the ingredients, such as high gluten flour, yeast, sugar, salt, vegetable shortening, whey, eggs and water, are initially mixed to make a dough and the dough is allowed to rise for a time of between 2½ hours and 3 hours at 50° F. or ½ hour at 80° F. The risen dough is rolled into sheets, and the sheets of dough are allowed to rise, suitably in baking pans, and then baked. The baked pizza crusts are then allowed to cool and assembled into stacks face-to-face. The stacks are then preliminarily assembled into packages, without actually defining the volume of the packages, and then pressed until the height of the stacks is reduced to less than one-half, after which the volume of the package is defined under compression, making the finished package. The package is then frozen.

The processing steps are important, and the steps that would normally not be considered critical have been found to be of great importance. In developing the process, unaccountably, the product when made on some occasions was not useable, and it has been found that certain precautions must be taken to produce a product of quality.

It is most important to allow the dough to rise for a time of 2½ to 3 hours at 50° F. or ½ hour at 80° F. If this step is omitted, a quality product is not obtained. It is also very important to have the sheets of dough rise in the pan before baking, as a quality product cannot otherwise be obtained.

One of the most deceptive features has been the need for cooling before stacking. If pizza crusts are stacked warm, they adhere together and cannot be separated. The crusts are assembled in a stack face-to-face. The pressing of the pizza crusts to a height of less than one-half their original height is important to prevent the crusts from being spongy.

Certain ingredients are of considerable importance.

The flour should be a high gluten flour as otherwise the successive risings do not occur. A high gluten flour should for example have approximately 13 to 14% of protein (in terms of the amount in the wheat).

The shortening should be a vegetable shortening, such as hydrogenated vegetable oil, and not animal shortening or animal fat. If animal fat is used, the resultant pizza crust will be soft instead of crisp and not of good quality.

The addition of whey is important. Whey is a solid product made by separating the curd from milk and removing the water. It makes the pizza crust light and crisp and is very different in its effect from dried milk. Dried milk contains animal fat which is harmful to the pizza crust.

EXAMPLE

The ingredients used in the preferred recipe are as follows:

| | |
|---|---|
| High gluten flour | 100 pounds |
| Yeast | 4.5 pounds |
| Sugar | 9 pounds |
| Salt | 7 ounces |
| Vegetable shortening | 4.5 pounds |
| Whey | 1.5 pounds |
| Eggs | 18 |
| Lukewarm water | 78 pounds, 6½ oz. |

The processing procedure is as follows:

The flour, shortening and eggs are introduced into a mixing bowl. The yeast, sugar, salt and whey are dissolved in the lukewarm water and this is added to the mixing bowl. The mixer is set at the slowest speed, and mixing and kneading proceed until the mix is homogeneous, usually about six minutes or more. The dough is then cut, weighed and shaped into approximately 117 equal dome-shaped portions, each about 1½ pounds and the smaller dome-shaped portions of dough 20 are put in wooden boxes that have been floured as shown in FIG. 2 and allowed to rise. Before putting the dome-shaped portions in the floured wooden boxes, they are sprinkled with flour so that they will not stick.

As an optional procedure, a second batch may be started before the first batch has been finished, and dome-shaped portion 20' may be distributed in the boxes as above.

Then the dome-shaped portions of dough are rolled, preferably using a rolling machine, and preferably making dough sheets rectangular so that they will fit in a pan of about 15 to 21 inches. The thickness of the rolled sheet is suitably about 1/16 inch or less. The sheets of dough are roled out, and put in pans on baker's paper. Baker's paper prevents the sheets of dough from sticking, prevents direct contact with the metal pan when they are baked, and is used for purposes of hygiene and cleanliness. Set the sheets of dough aside to rise at room temperature (preferably about 80°) until they have come to a height of about ½ inch.

The baking is in an oven which may be approximately 450° F. to 700° F. for a time of about four minutes if done at 700° F., and proportionately longer if the oven is at lower temperatures. The baked crusts are then removed from the pan and placed on a rack to cool to room temperature.

The baked and cooled pizza crusts are then assembled into stacks, and the individual pizza crusts are placed face-to-face in the stack. The number of pizzas in the stack may be 50 pizza crusts. The pizza crusts are wrapped before pressing, the practice being to put a disassembled box loosely around the assembled stack of pizza crusts but not to establish the volume of the eventual package at this time. The stack is placed in a pan under a weight of about 50 pounds, which brings pressure on the pizza on their 15 to 21 inch surface. The weight is left in place for about ten minutes, or until the pizzas are compressed from their original spongy condition in which each pizza is about ½ inch thick, to less than ¼ inch individually.

The stack of pizza crusts 21 is shown in FIG. 3. The weight 22 compresses it to a compressed stack 23 as shown in FIG. 4.

Before applying the weight to the stack of pizza crusts, they are placed in a box but the box is not closed until after the weight is applied. When the stack of pizza crusts have been compressed sufficiently, the box is closed and sufficient force is applied to hold it closed despite presure of the expanding stack.

The box of pizza crusts is then sealed and put into the freezer.

The freezing container is preferably at a temperature of 20° F., 15° F. or below.

The size of the box is preferably 21½ inches by 15½ inches by 11½ inches.

The pizza crusts may be stored for future use. The packages of pizza crusts are sold to individuals, restaurants, private owners or any type of organization, large or small.

When the pizza crust comes out of the package in frozen form, it is placed in a pan and a suitable sauce or other ingredients are placed over it. This may be a tomato sauce, a tomato sauce with cheese, pepperoni, mushrooms, anchovies, etc. or any modified sauce. The frozen crust with the cheese or sauce on it is put in a hot oven, preferably about 450° F., for a few minutes or until the cheese on the surface of the sauce is melted or bubbles and until the crust becomes pliable according to taste.

It will be evident that the method of making pizza crusts according to the invention contributes to the ability of the crusts to withstand storage and at the same time to produce a fresh tasting, crisp, delightful crust which is entirely free from toughness, leatheriness, sogginess or segregation or separation into different layers. The pizza crust of the invention when cut and served is of uniform consistency, and not hard on the bottom or soft on the top.

In view of my invention and disclosure, variations and modifications to meet individual whim or particular need will doubtless become evident to others skilled in the art to obtain all or part of the benefits of my invention without copying the method shown, and I, herefore, claim all such insofar as they fall within the reasonable spirit and scope of my claims.

Having thus described my invention what I claim as new and desire to secure by Letters Patent is:

1. The method of making pizza crusts which comprises mixing together the following composition:

| | |
|---|---|
| High gluten flour (approximately 13 to 14% protein) | 100 pounds |
| Yeast | 4.5 pounds |
| Sugar | 9 pounds |
| Salt | 7 ounces |
| Vegetable shortening | 4.5 pounds |
| Whey | 1.5 pounds |
| Eggs | 18 |
| Lukewarm water | 78 pounds, 6½ oz. | thus forming a dough, allowing the dough to rise for ½ hour at 80° F. or 2½ hours to 3 hours at 50° F., rolling the dough to sheets approximately 1/16 inch thick, allowing the sheets to rise, baking the sheets of dough in pans to produce crusts, removing the crusts from the pans, allowing the crusts to cool to room temperature, assembling the individual crusts into a stack, the individual crusts being face-to-face, putting the stack of crusts into a container, applying about 50 pounds weight to the stack of crusts until the height will be less than one-half the original height, closing and sealing the container while maintaining the stack under compression, and freezing the sealed container.

2. The method according to claim 1, in which the first rising has an elapsed time of ½ hour at 80° F.

3. The method according to claim 1, in which the sheets of dough rise to a height of about ½ inch in the pans.

References Cited

UNITED STATES PATENTS

| 2,668,117 | 2/1954 | Bucci | 99—92 XR |
| 3,189,463 | 6/1965 | Jones | 99—86 |

OTHER REFERENCES

Brown, "How to Cook Superbly Yeast Rolls and Buns," Woman's Day Encyclopedia of Cookery, vol. 12, pp. 1952–1953 (1967). Copy in 99/90 R.

JAMES R. HOFFMAN, Primary Examiner

U.S. Cl. X.R.

426—27